(No Model.)
H. W. CHAMBERLAIN.
HITCHING DEVICE.
No. 556,917. Patented Mar. 24, 1896.
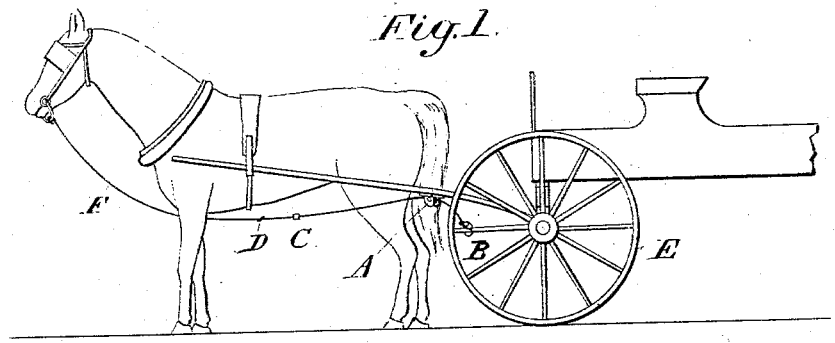
Fig. 1.
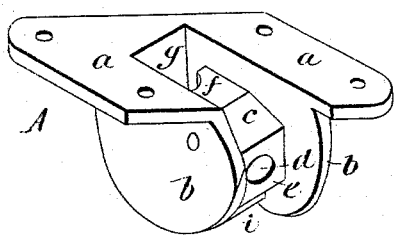
Fig. 2.
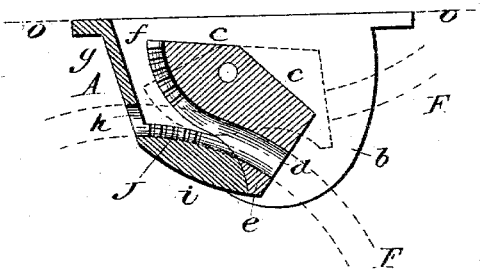
Fig. 3.
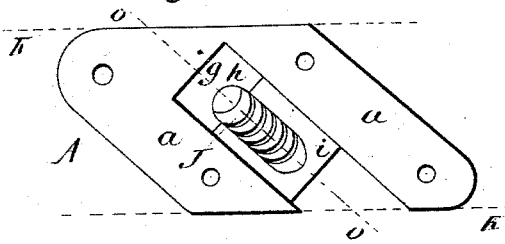
Fig. 4.
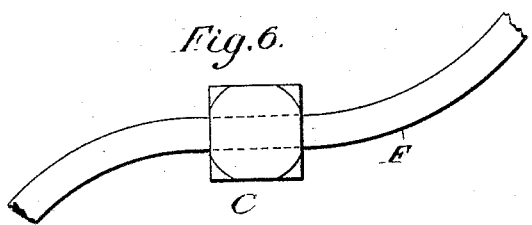
Fig. 5.
Fig. 6.
Witnesses
Inventor
Harold W. Chamberlain.

UNITED STATES PATENT OFFICE.

HAROLD W. CHAMBERLAIN, OF NEW YORK, N. Y.

HITCHING DEVICE.

SPECIFICATION forming part of Letters Patent No. 556,917, dated March 24, 1896.

Application filed June 8, 1894. Serial No. 513,975. (No model.)

*To all whom it may concern:*

Be it known that I, HAROLD W. CHAMBERLAIN, residing in the city, county, and State of New York, have invented a new and useful Hitching Device; and I do hereby declare the following to be a full, clear, and exact description of my invention, such as will enable any person skilled in the art to which it appertains to make and use the same.

My invention relates to improvements in hitching devices in which the hitching-line is to be attached to the vehicle-wheel; and the objects of my invention are to provide an appliance by which a horse may be fastened wherever it is desired, and which at the same time acts as a wheel-lock, which is simple, readily adjustable, and adapted to any wheeled vehicle; and to this end my invention consists of the several parts and attachments and their combinations, as more fully appears in the following description and claims.

In the accompanying drawings, which illustrate my invention, Figure 1 is a side view of the hitching device in operation. Fig. 2 is a detail perspective view showing the structure and action of the cam-lever in the frame. Fig. 3 is a central vertical longitudinal section of the frame and gripping device. Fig. 4 is a plan view of the frame, showing the position and interior of the same. Fig. 5 is a detail view of the hitching-hook, showing a mode of fastening to the wheel. Fig. 6 is a detail view of the stop on the hitching-line.

Similar letters refer to similar parts throughout the several views.

When a part or method is hereinafter referred to as preferable, the invention is not limited to the same.

The device is provided with a hitching-line F, adapted to be connected to the horse's muzzle, preferably to the bit-rings, at one end and attachable by suitable means to one of the wheels at the other end. Any suitable flexible connection may answer; but I prefer a round line, such as window-cord, as this draws more easily than a strap through the gripping device hereinafter described, is strong, cheap, and admits of a more compact casting.

The connection to the muzzle or bit-rings may be made in a variety of ways and answer the purpose of my invention. That herein shown is a line passing under the horse's breast and between his fore legs and connecting by means of a snap-hook with a chin-piece attached to the bit-rings; but the line may connect the wheel with the horse's head in any way found convenient, either directly or indirectly, and answer the purposes of this invention. The line may be adjusted as to length by cutting off a piece from the rear end and fastening the hook on again, or in other ways, such as making a knot or two in the line where it will not interfere with the action of the device.

The attachment to the wheel may be made in any way that is suitable and come within the scope of my invention; but I use as preferable a hook, attached to the rear end of the line and adapted to be passed over the rim or preferably the spoke of the wheel and hooked freely over the line, so as to draw up like a slip-noose. The hook may be covered with rubber as a safeguard against slipping on the wheel or marring it. The form shown in Fig. 5 has a shank $l$, with a longitudinal socket open at both ends and fitted to the end of the line, and having a pointed screw $n$, fastening the end therein.

The gripping device is an important feature of my invention. Any appliance will come within the scope of this device, broadly, which comprises a gripping-lever pivoted in a frame fixed by suitable means to a part of a vehicle adjacent to the wheel to which the line is to be fastened, and a rigid bearing either constituting the base-plate of the frame or made a separate fixture, against which the inner or under part of the lever is adapted to grip the line when the backward turn of the wheel sways the line and tips the lever. The lever may be of any suitable construction, provided it has an arm at its outer end adapted to actuate the lever with force when the line sways upon it, and has a gripping-surface adapted to jam the line against the fixed piece or bearing when the lever-arm is raised. Thus a T-lever may answer if the fixed bearing is adjusted to coact with the lever when the line is pressed by the latter.

I have also invented and use as preferable the following-described species of gripping device: It is shown in Figs. 2 and 3, where the line $o\ o$ indicates the middle section of the gripping-lever and frame. In this form the lever is a cam-lever—that is, it has a gripping-face with the curve of a cam or eccentric. The lever-arm has an inclosed longitudinal passage through the same, adapted to allow the line to be drawn freely through it. The bar or rigid part e, inclosing the lower side of the passage, is attached to the lever-arm or preferably integral therewith, and its function is to enable the line to open the grip when the wheel turns forward. The arm of the lever is preferably depressed, as shown in Fig. 3, so as to insure its working clear of the thill or part to which the frame is attached. The cam-lever has also preferably a roughened groove f, Figs. 1 and 2, in its curved face to afford the strongest grip, though my invention is not confined to either a groove or roughened face. The cam-lever is preferably cast in one piece of tough metal.

In connection with the cam-lever as a part of this species of my gripping device is the frame or case A, Figs. 1, 2, and 3, having two sides to and between which said cam-lever is pivoted, and preferably having horizontal perforated flanges or ears fixed to the sides as means of attachment, as shown in Fig. 4. The fixed bearing (in this specific gripping device) against which the cam-lever is adapted to grip the line constitutes the base-plate i, Figs. 2, 3, and 4, of the frame and is preferably integral with the latter. The base-plate also has preferably a groove opposite that in the cam-face, though my invention is not limited to the same.

The whole frame is preferably cast in one piece of tough metal, as brass, soft steel, or malleable iron, and preferably on a diagonal of about forty-five degrees, more or less, with the thill or longitudinal direction of the vehicle, as shown in Fig. 4 by dotted lines K K, thus giving the hitching-line a straighter course than it could otherwise have and avoiding unnecessary friction in drawing through the frame, though my invention is not confined to a single casting for the frame or to the diagonal disposition of the slot.

The frame may be attached to any part of the vehicle adjacent to the rim of the wheel used, as the thill, step, cross-bar, body, spring, side bar or other part found convenient, according to the kind or style of vehicle. In any case the nearer the frame is placed to the rim of the wheel the better, and in most cases it should be near the front of the wheel used, (whether fore or hind wheel,) though on some vehicles it may be placed opposite the rear of the wheel, when it must be inverted and the flanges or other means of attachment arranged accordingly; or the frame may be fastened side uppermost, so that the gripping-lever will work horizontally instead of vertically and the top side and flanges may be dispensed with. In any of these cases the device will come within the scope of my invention.

The frames may be made in rights and lefts to fit either side of the vehicle, and the means of attachment those commonly used in fastening metal to iron or wood, such as screws or bolts, through flanges. In fixing the frame to a spring or any part which is not to be bored the flanges may be longer than in other cases, so as to project beyond such part and allow straps to be laid over the part and passed through holes in the flanges and secured with nuts.

The frames may be attached to the under side of the step, holes being bored through the same to admit the bolts, preferably bevel-headed, by which the frames are attached.

When the device is placed on a thill, the back of the frame should be rounded as a safeguard against hurting the horse, though my invention is not limited to that form.

I use a cam-lever some two inches long and a frame of about three inches in length as a convenient size for ordinary vehicles.

The stopping device is also an important though simple part of my invention. It consists, broadly, of a stop securely fixed upon the hitching-line, and also a piece of rigid material fixed by suitable means and having a hole through the same adapted to allow the line to be drawn freely through it, but sufficiently small to prevent the stop from passing. This piece may be fixed in any suitable way, directly or indirectly, to any convenient part of the vehicle or harness. It may be fixed rigidly or hung on a flexible attachment. It may be a part of the frame hereinafter described or not. The stop on the line may also be of any suitable form, material, or number of parts or have any effective mode of attachment, provided it is of sufficient size and rigidity to prevent its being drawn through the hole in the fixed piece and is securely fixed to said line. In fact the stopping device may be used with or without my gripping device, and in any of these forms or modes the stop and fixed piece will come within the scope of my stopping device, broadly.

I have also devised and use as preferable the following species of the stopping device: I make a knot D in the hitching-line F, Fig. 1, forward of the frame. A washer C, Figs. 1 and 6, of any suitable material may be strung on the line between the stop and frame, to prevent abrasion of the knotted part of the line, and, if of metal, to draw in the slack when the line is unfastened. I prefer leather, but the washer is not an essential part of my invention.

To co-operate with the knot described, I provide as a part of this species of the stopping mechanism the guide-plate g of the frame, integral with or affixed to the frame and having the hole o, adapted to allow the line to be drawn freely through the same, but sufficiently small to prevent the knot from passing.

My invention is applied as follows: The hitching-line is intended to remain with the vehicle whether in use or not. In harnessing, the line is connected to the horse's muzzle, preferably by snapping into a chin-piece attached to the bit-rings. It so remains till the horse is unharnessed, the end of the line back by the wheel meanwhile hanging loose or being passed around the thill or adjacent fixture of the vehicle and hooked over itself or some small fixture. When it is desired to hitch the horse, the line is attached to the wheel nearest it, preferably by a hook on the rear end of the line, which is simply passed once or twice around the rim or preferably spoke of the wheel and hooked over the line, as shown in Fig. 5, forming a slip-noose. If the horse attempts to start ahead, the wheel in turning forward pulls on the line, (which draws freely through the gripping device,) and if this is not sufficient the wheel is locked by the resistance of the horse's head or by the stop described and the horse is pulled up. Then, as the line is pulling on his bit, he will naturally take a step back, and this will slack up the line. If he attempts to back beyond the point where he was hitched, the wheel at once swings the line so that it tips the gripping-lever c, as shown by the dotted lines in Fig. 3, which grips the line and prevents pulling back on the horse's head, and at the same time locks the wheel and prevents backing. If the horse attempts to go ahead after backing against the vehicle, the gripping-face of the lever is lifted from the line by means of the bar e, Fig. 2, so that the line is free to pull back on the horse.

The reasons for locking the wheel on the forward turn are that it is a great aid in stopping the horse, while it is a safeguard against injury by excessive strain upon his head, and also prevents winding on the hub and breaking the line or fouling it with wheel-grease. After a few attempts at starting, a horse will generally remember the lesson and learn to stand, so that this device, while not violent, is an educator of the horse.

When the appliance is put on the vehicle, care should be taken to adjust the stop D, Fig. 1, once for all, far enough forward on the line to allow a sufficient length of pull, and yet far enough back to prevent the line from being carried beyond the point E. This margin is to allow for the line stretching or the vehicle springing down, and if the vehicle is at all heavy or the horse hard to pull up it is best to adjust the stop so that it will lock the wheel when the hook is carried to the next spoke forward of the point E, for it should be remembered that the power of the pull increases rapidly after the wheel has turned several spaces, and when at the point D near the dead-center it is great, varying from about fifty pounds with a light weight to two hundred pounds and over with a heavy weight. If the horse is hard-bitted or the vehicle very light, a special bit may be used either as a bridle bit or extra.

The device may be used double, one for each side of the vehicle. In this case the hitching-lines may either unite in one, connecting by means of branches with the bits, or may lead forward separately, each being attached to the bit-ring on its side of the horse. The double use gives double power and more effectually prevents turning, especially when applied to the front wheels. With two horses, when the vehicle is a heavy one, the device may be used with one wheel alone, the line dividing to each horse, while with a light carriage it is better to use the arrangement double, each horse being hitched by the device on his side of the vehicle.

My invention presents, among other advantages, the following: It is applicable to all kinds of wheeled vehicles or to the front wheels alone, and may be used with one or several horses; it is safe, as if the wheel-locking device should break, being one with the hitching-line, it could not get the horse into trouble, as it would if separate; it is simple, certain in action, and the entire length of the pull can be obtained; it is readily adjusted and can be put on without defacing the carriage; it affords a ready and simple means of hitching wherever a vehicle may be, without dependence on posts, rings or curbstone fastenings or the inconvenience of handling a hitching-weight.

Having thus fully described my invention, I do not claim, broadly, a hitching-line connecting a horse's bridle with a wheel, nor mechanism in a hitching device for locking a wheel, broadly; but

I do claim and desire to secure by Letters Patent—

1. In a device of the class described, the combination with a rope or strap adapted to be connected at one end to the horse and at its other end to a wheel of the vehicle, of a bearing for said rope or strap, said bearing being located adjacent said wheel, and a clamping member opposed to and co-operating with said bearing, adapted when moved in one direction to clamp the rope or strap against movement, substantially as described.

2. The combination with a line adapted to be connected at one end to the horse and at its other end to a wheel of the vehicle, of a clamp secured to the vehicle, and means to operate said clamp to hold the line on backward rotation of said wheel, substantially as described.

3. The combination with a line adapted to be connected at one end to the horse and at its other end to a wheel of the vehicle, of a clamp secured to the vehicle, and means to operate said clamp on rotation of said wheel, substantially as described.

4. A hitching-line arranged to connect a horse's head with a vehicle-wheel, in combination with a clamping-lever pivoted to a frame attached to a part of the vehicle adjacent to said wheel, and a rigid bearing fixed by suitable means opposite and adjacent to the gripping-face of said lever to receive said line between it and the clamping-face of said lever to be clamped therein by the movement of said lever, substantially as described.

5. A hitching-line adapted to be secured at one end to the horse and at its other end to a wheel of the vehicle, combined with a guide therefor fastened to the vehicle, and a stop on said line to co-operate with said guide and lock the wheel, substantially as described.

6. A hitching-line adapted to be secured at one end to the horse and at its other end to a wheel of the vehicle, combined with a guide therefor fastened to the vehicle, and a stop on said line to co-operate with said guide and lock the wheel, said stop being so placed on said line relatively to said guide that the backward movement of the line caused by rotation of the said wheel causes said line to pull on the horse before the said stop and guide co-operate to lock the wheel, substantially as described.

7. A hitching-line adapted to be secured at one end to the horse and at its other end to a wheel of the vehicle, combined with a guide therefor fastened to the vehicle, and an adjustable stop on said line to co-operate with said guide and lock the wheel, substantially as described.

8. A hitching-line adapted to be secured at one end to the horse and at its other end to a wheel of the vehicle, combined with a guide therefor fastened to the vehicle, a stop on said line to engage said guide and prevent further backward movement of the line, a clamp for said line, and mechanism operated by the backward rotation of said wheel to move said clamp into operative clamping engagement with said line, substantially as described.

9. A hitching-line adapted to be secured at one end to the horse and at its other end to a wheel of the vehicle, combined with a guide therefor fastened to the vehicle, a stop on said line to engage said guide and prevent further backward movement of the line, a clamp for said line, said clamp having a clamping member provided through its rear portion with a perforation to receive said line, whereby said clamp is operated by the bending of the line toward and from said clamping member, substantially as described.

In testimony whereof I affix my signature in presence of two witnesses.

HAROLD W. CHAMBERLAIN.

Witnesses:
JOSEPH A. FARLY,
THOS. M. O'NEIL.